United States Patent
Blood

(10) Patent No.: US 6,694,391 B2
(45) Date of Patent: Feb. 17, 2004

(54) COMBINATION COMPUTER MOUSE AND TELEPHONY HANDSET

(75) Inventor: Roger M. Blood, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 325 days.

(21) Appl. No.: 09/761,295

(22) Filed: Jan. 16, 2001

(65) Prior Publication Data

US 2002/0095535 A1 Jul. 18, 2002

(51) Int. Cl.[7] .............. G06F 13/00; H04B 1/38; G09G 5/08
(52) U.S. Cl. .............. 710/62; 710/72; 710/73; 345/157; 345/163; 455/557
(58) Field of Search .............. 710/62, 72, 73; 345/157, 163; 455/557

(56) References Cited

U.S. PATENT DOCUMENTS

| | | | | |
|---|---|---|---|---|
| 5,631,669 A | * | 5/1997 | Stobbs et al. .............. | 345/163 |
| 5,659,335 A | * | 8/1997 | Partridge, III .............. | 345/157 |
| 5,805,144 A | | 9/1998 | Scholder et al. .............. | 345/163 |
| 5,847,695 A | * | 12/1998 | Duncan et al. .............. | 345/163 |
| 5,943,625 A | * | 8/1999 | Yeom et al. .............. | 455/557 |
| 6,285,354 B1 | * | 9/2001 | Revis .............. | 345/163 |

FOREIGN PATENT DOCUMENTS

JP          408079353 A   *   3/1996

* cited by examiner

Primary Examiner—Jeffrey Gaffin
Assistant Examiner—Tammara Peyton
(74) Attorney, Agent, or Firm—Haynes and Boone, LLP

(57) ABSTRACT

A computer peripheral apparatus includes a housing having a first portion and a second portion connected to the first portion. The second portion is pivotable between a first position nested with the first portion and a second position extended from the first portion. The first portion includes computer mouse input members and a telephony handset. The second portion includes a telephony microphone.

20 Claims, 2 Drawing Sheets

COMBINATION COMPUTER MOUSE AND TELEPHONY HANDSET

BACKGROUND

The disclosures herein relate generally to computer systems and more particularly to a computer mouse and a telephony handset for use with the computer system.

As the use on internet based telephony becomes more commonplace, personal computer (PC) users will be needing more convenient methods of accessing the microphone/speaker combination of peripherals. It is often inconvenient to use a separate microphone and speaker when using Internet phone applications due to privacy concerns, and the problem resulting from echoes feeding back into the user's microphone from the speakers. One solution is to use a headset, which replaces the speaker/microphone functions. Headsets for this application are available on the market today.

A problem when using traditional headsets is that there is no easy way to direct the speaker signal into the headset without changing the plugs. This provides an inconvenient loss of the speaker function when set up to use the headset.

Aftermarket headsets are available in many forms. One drawback to using headsets is the fact that an additional peripheral is now cluttering up the desktop or the accessories pouch of a portable computer. There is no known solution to the problem of speaker/headset selection other than a custom switch box.

Telephone handsets are well known and include an elongated body having a gripping portion so as to be hand-held, a speaker portion which is held near the user's ear, and a microphone portion that is positioned near the user's mouth when in use.

A computer mouse is well known, such as that described in U.S. Pat. No. 5,805,144. The mouse includes input members such as click members or buttons and a mouse movement tracking member such as a rolling ball.

Therefore, what is needed is a single device which can be used as a computer mouse and a telephony handset.

SUMMARY

One embodiment, accordingly, provides a peripheral device which functions as a computer mouse and a handset. To this end, a computer peripheral apparatus includes a housing having a first portion and a second portion. The first portion includes computer mouse input members and a telephony handset speaker. The second portion includes a telephony microphone.

A principal advantage of this embodiment is that by combining the computer mouse and the telephony handset into one peripheral device, the number of computer accessories is reduced and user convenience is enhanced.

DETAILED DESCRIPTION

Figure 1:
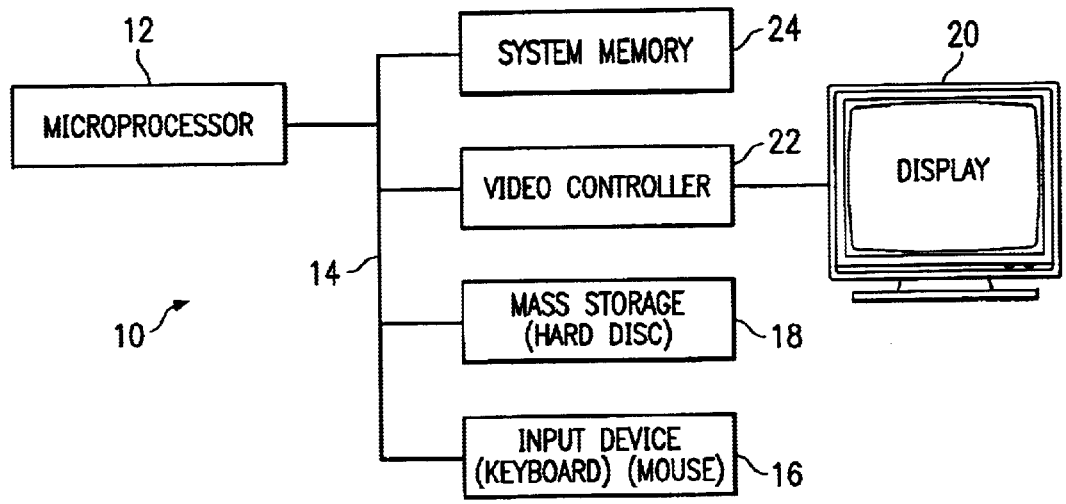
FIG. 1 is diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input system 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
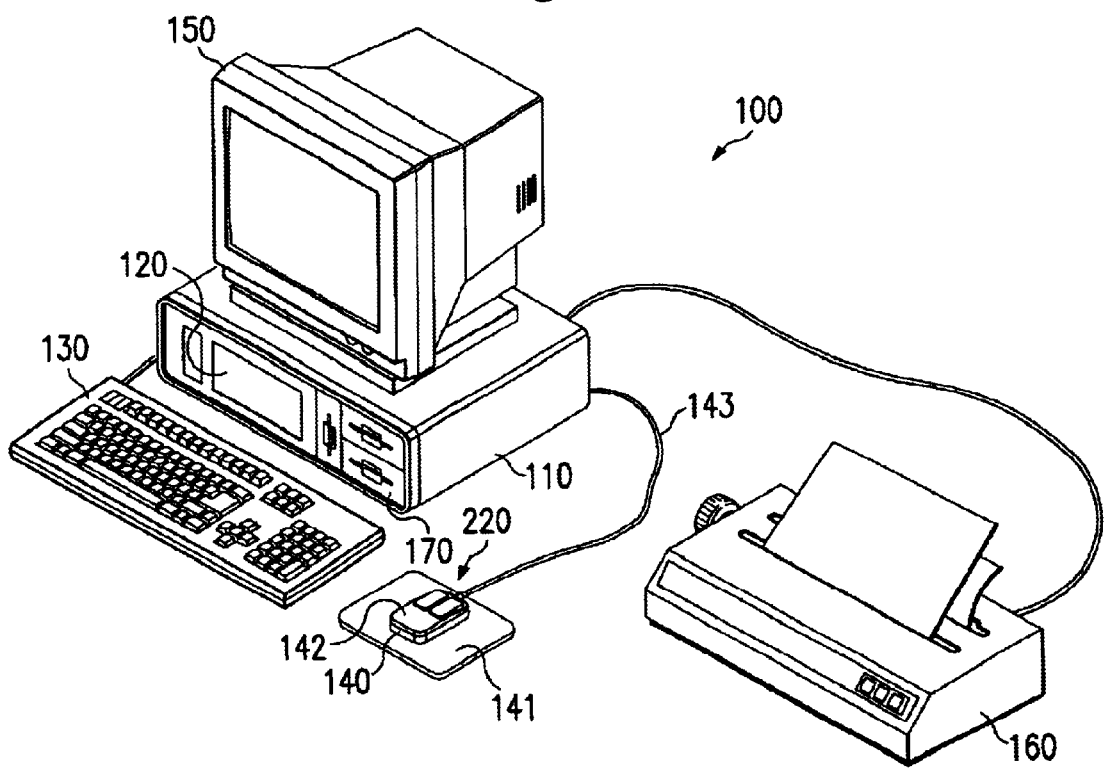
FIG. 2 is a perspective view illustrating an embodiment of a computer system.

Referring initially to FIG. 2, illustrated in an isometric view of a PC 100 providing an environment within which the present embodiments can operate. The PC 100 comprises a main chassis 110 containing computer system components discussed above. The main chassis 110 features, among other things, a reset button 120, a single pole momentary switch used to signal a CPU and other components (e.g. memory and input/output ("I/O") controllers not shown in FIG. 2) within the PC 100 to reboot, thereby providing a means of rebooting the PC 100. Coupled through individual connectors on the main chassis 110 are a keyboard 130, a mouse 140 and a video monitor 150 (constituting external data input and output devices).

The mouse 140 is adapted to traverse the surface of a mousepad 141. Further, a user can selectively enter information by placing pressure on an upper surface 142 of the mouse 140. Traversal of the mousepad 141 and pressure on the upper surface 142 generate control signals that travel through a mouse cord 143 to a mouse connector (not shown) on a rear side of the main chassis 110. Driver software executing within the main chassis 110 receives, modifies and stores the control signals for use by application programs.

A printer 160 is also shown coupled to a parallel port on a rear surface of the main chassis 110. The parallel port allows the PC 100 to send character or graphical data to the printer 160 for printing thereby. The peripheral devices 130, 140, 150, 160 allow the PC 100 to interact with a user. FIG. 2 also shows a disk drive 170, allowing permanent storage of computer system data of magnetic media.

A combination computer mouse and telephony handset is designated 220 in FIGS. 2–5, and includes a housing 222 having a first portion 224 and a second portion 226 pivotally connected to the first portion at a pivotal connection 228. The second portion 226 includes a telephony microphone 242. The first portion 224 includes a plurality of computer mouse input members including a first click member 230, a second click member 232 and a mouse movement tracking member, i.e. rollerball, 234. A telephony speaker 240 is also included in the first portion 224.

Figure 3:
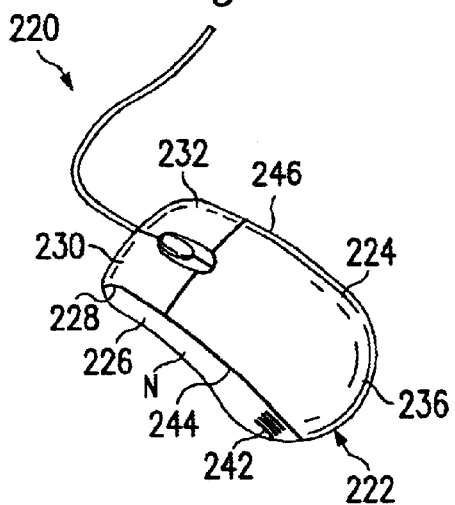
FIG. 3 is a perspective view illustrating an embodiment of a mouse and handset combination.

Housing 222 includes a hand grip side 236 and a flat side 238, opposite the hand grip side 236. The flat side 238 slides on the mousepad 141, see also FIG. 2. The first and second hand click members 230, 232, respectively, FIG. 3, are mounted on the hand grip side 236. The tracking member 234 and the speaker 240, FIGS. 4 and 5, are mounted on the flat side 238.

Figure 4:
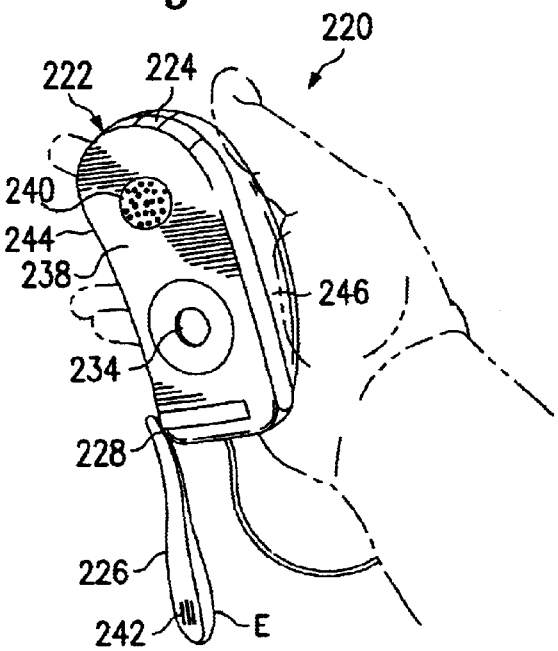
FIG. 4 is another perspective view of the combination of FIG. 3.

In one embodiment, FIGS. 3 and 4, the housing 222 includes a pair of opposed edges 244, 246. One of the edges 244 includes the second portion 226 carrying the microphone 242. Thus, the second portion 226 is pivotable at 228 to extend the microphone 242 from the first portion 224.

Figure 5:
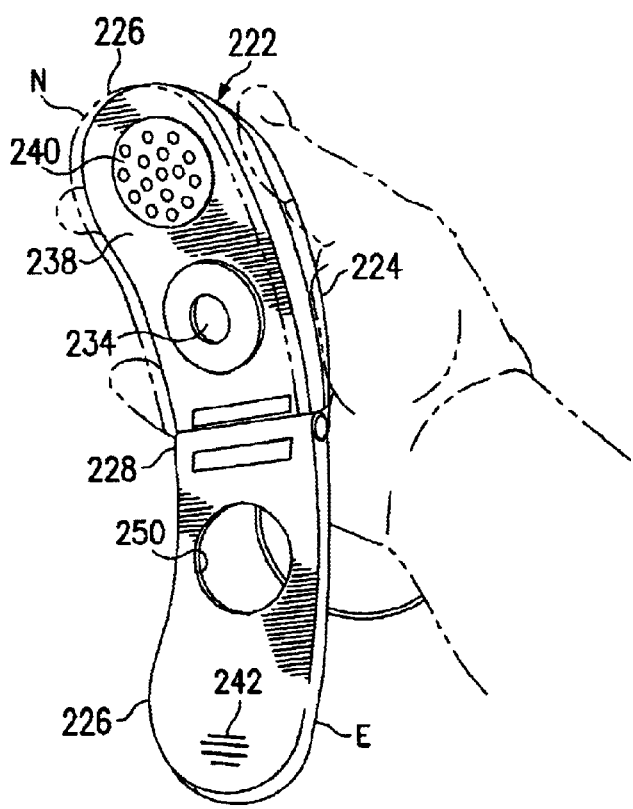
FIG. 5 is a perspective view illustrating another embodiment of a mouse and handset combination.

In another embodiment, FIG. 5, the second portion 226 is a substantially planar portion carrying the microphone 242. Thus, the second portion 226 is pivotable at 228 to extend the microphone 242 from the first portion 224.

From the foregoing, it can be seen that the second portion 226 is substantially planar and is pivotable between a first position N, FIGS. 3–5, nested with the first portion 224, and a second position E, extended from the first portion 224. An opening 250, FIG. 5, is provided in second planar portion 226 for exposing the tracking member 234 when the second planar portion 226 is in the nested position.

Most computers today are using a mouse as an input device. By combining a mouse and a handset into one peripheral, the problem of multiple accessories is reduced. In addition, the phone handset is now always conveniently located. The configuration can take on one of several forms depending on the desired style. Two embodiments are shown; one has an edge that swivels down to extend the microphone closer to the user's mouth. Another example shows a "flip" type implementation where the mouse opens up to provide for the microphone extension.

To avoid the problem of speaker switching, the signal to the computer speaker is first routed to the mouse-handset, and is switched either to the computer speaker or the handset speaker depending on whether the mouse-handset is opened for operation or not, i.e. the microphone is extended. Attenuation circuits may also be employed to keep the volume at the appropriate levels.

As it can be seen, the principal advantages of these embodiments are that by combining the computer mouse and the telephony handset into one peripheral device, the number of computer accessories is reduced. In addition, the handset is conveniently located. Furthermore, speaker switching is not required.

Although illustrative embodiments have been shown and described, a wide range of modification change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A combination computer mouse and telephony handset comprising:
   a housing having a first portion and a second portion pivotally connected to the first portion, the second portion being movable between a first position nested with the first portion and a second position extended from the first portion;
   the first portion including computer mouse input members, a rotatably mounted tracking member and a telephony handset speaker; and;
   the second portion including a telephony microphone and an opening, whereby when the second portion is in the first position, nested with the first portion, the tracking member protrudes through the opening.

2. The combination is defined in claim 1 wherein the housing includes a flat side for sliding on a surface, and a hand grip side opposite the flat side.

3. The combination as defined in claim 2 wherein the computer mouse input members include a first click member and a second click member.

4. The combination as defined in claim 3 wherein the first and second click members are on the hand grip side, and the tracking member and the speaker are on the flat side.

5. The combination as defined in claim 4 wherein the housing includes a pair of opposed edges, one of the edges comprising the second portion.

6. The combination as defined in claim 5 wherein the microphone in the second portion is extendible from the first portion.

7. The combination as defined in claim 4 wherein the second portion is a substantially planar portion pivotable into and out of abutment with the flat side.

8. The combination as defined in claim 7 wherein the microphone in the second portion is extendible from the first portion.

9. A computer peripheral apparatus comprising:
   a housing having a first portion and a second portion connected to the first portion, the second portion being pivotable between a first position nested with the first portion and a second position extended from the first portion;
   the first portion including computer mouse input members, a tracking member and a telephony handset; and
   the second portion including a telephony microphone and an opening, whereby when the second portion is in the first position, the tracking member operably protrudes through the opening.

10. A computer system comprising:
    a chassis;
    a microprocessor mounted in the chassis;
    a storage coupled to the microprocessor; and
    an input coupled to provide input to the microprocessor, the input including a computer mouse in combination with a telephony handset comprising:
    a housing having a first portion and a second portion pivotally connected to the first portion;
    the first portion including computer mouse input members, a protruding tracking member and a telephony handset speaker; and
    the second portion including a telephony microphone and an opening, whereby when the second portion is in the first position, the tracking member operably protrudes through the opening.

11. The system as defined in claim 10 wherein the housing includes a flat side for sliding on a surface, and a hand grip side opposite the flat side.

12. The system as defined in claim 11 wherein the computer mouse input members include a first click member and a second click member.

13. The system as defined in claim 12 wherein the first and second click members are on the handgrip side, and the tracking members and the speaker are on the flat side.

14. The system as defined in claim 13 wherein the housing includes a pair of opposed edges, one of the edges comprising the second portion.

15. The system as defined in claim 14 wherein the microphone in the second portion is extendible from the first portion.

16. The system as defined in claim 13 wherein the second portion is a substantially planar portion pivotable into and out of abutment with the flat side.

17. The system as defined in claim 16 wherein the microphone in the second portion is extendible from the first portion.

18. A method of providing a telephony handset in combination with a computer mouse comprising:

providing a housing having a first portion and a second portion movably mounted on the first portion for movement between a first position nested with the first portion, and a second position extended from the first portion;

providing a computer mouse including input members and a protruding tracking member in the first portion;

providing a telephony speaker and an opening in the second portion; and nesting the second portion with the first portion, whereby the tracking member operably protrudes through the opening.

19. The method as defined in claim 18 further comprising:

pivoting the extension member to the nested position with the housing for using the mouse.

20. The method as defined in claim 19 further comprising:

pivoting the extension member to an extended position away from the housing for using the telephony handset.

* * * * *